Feb. 19, 1924.

R. HUFF 1,483,886

TRANSMISSION LOCK

Filed July 19, 1921    2 Sheets-Sheet 1

Inventor
Russell Huff
By his Attorneys
Newell and Spencer

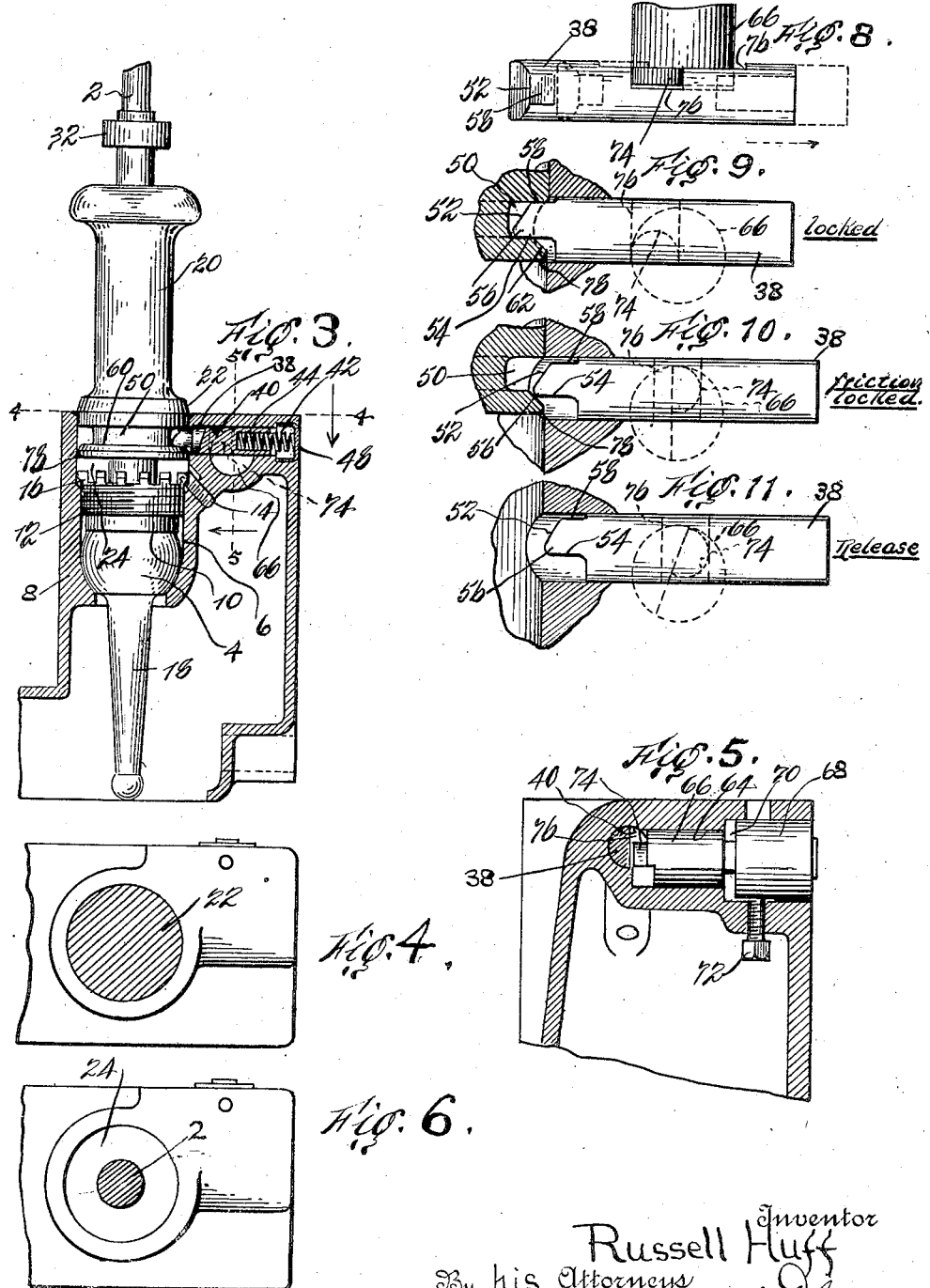

Patented Feb. 19, 1924.

1,483,886

UNITED STATES PATENT OFFICE.

RUSSELL HUFF, OF DETROIT, MICHIGAN, ASSIGNOR TO DODGE BROTHERS, OF DETROIT, MICHIGAN, A CORPORATION OF MICHIGAN.

TRANSMISSION LOCK.

Application filed July 19, 1921. Serial No. 485,891.

*To all whom it may concern:*

Be it known that I, RUSSELL HUFF, a citizen of the United States, residing at Detroit, Wayne Co., Michigan, have invented certain new and useful Improvements in Transmission Locks, of which the following is a clear, full, and exact description.

This invention relates to means for locking the gear shifting or change-speed levers of motor vehicles in neutral position to prevent unauthorized connection between the motor and the transmission, whereby unauthorized use or the stealing of motor vehicles may be prevented.

A general object of the invention is to provide an improved construction of transmission or change-speed lever locking means which will lock the lever in neutral position more effectively than means for this purpose heretofore devised, which is so constructed that it cannot readily be broken or otherwise tampered with in a way to render it ineffective for its purpose, and which nevertheless can be easily and conveniently manipulated by the owner of the motor vehicle.

An important feature of the invention is the provision in a change-speed lever lock of the slidable sleeve type, of a locking connection which is not affected by turning of the sleeve about the axis of the lever. Another important feature of the invention is the construction of the locking mechanism so that, while the slidable sleeve tends automatically to move out of locking position and is arranged to be yieldingly held in locking position when moved thereinto, positive locking of the sleeve in position to hold the change-speed lever against gear shifting movement can only be effected by the key which also serves to unlock the sleeve. This prevents locking of the change-speed lever when the owner has either forgotten or lost his key.

Other important features and objects of the invention will appear from the following description and claims when considered in connection with the accompanying drawings, in which—

Figure 1:
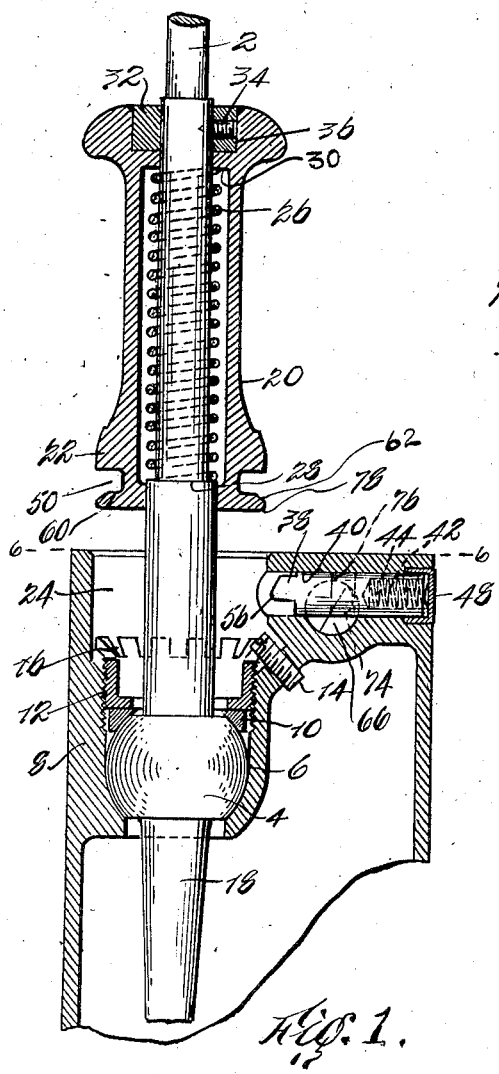
Figure 7:
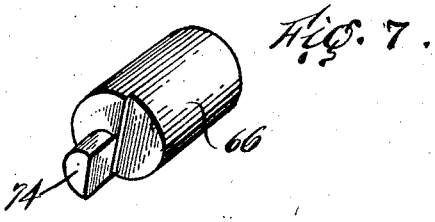
Figure 2:
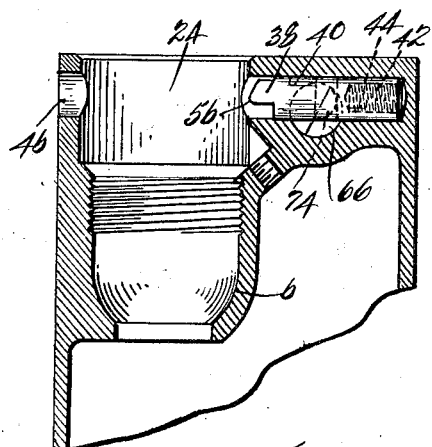

Fig. 1 is a vertical section through the change-speed lever bearing and a housing for this bearing in which a change-speed lever locking mechanism embodying the present invention has been incorporated, this view also showing a section through the locking mechanism; Fig. 2 is a detail illustrating a slightly different manner of holding the locking bolt in position in the housing; Fig. 3 is a section similar to Fig. 2, but with part of the mechanism shown in full lines; Fig. 4 is a section on the line 4—4 Fig. 3; Fig. 5 is a section on the line 5—5 of Fig. 3; Fig. 6 is a section on the line 6—6 of Fig. 1; Fig. 7 is a perspective view of the rotatable barrel of the lock; Fig. 8 is a plan view of the locking bolt and associated bolt operating barrel; and Figs 9, 10 and 11 are views illustrating different positions of the locking bolt.

In the illustrated embodiment of the invention, the gear shifting lever 2, which may be substantially of ordinary construction, is provided with a ball-shaped enlargement 4 arranged to fulcrum in a universal bearing seat 6 in a housing 8, preferably constituting a part of the transmission casing. A removable ring 10 shaped to bear against the upper part of the ball 4 is secured in adjusted relation to the ball 4, to complete the universal bearing for the gear shifting lever, by means of a hollow threaded member 12 engaging said ring and threaded into the interiorly threaded part of the housing 8 above the bearing 6. The member 12 may be locked in adjusted position by a set screw 14 extending through one of the slots 16 in the upper end of said member. The lever 2 has the usual extension 18 below the universal bearing, which extension is arranged to travel in the slots in the usual H-plate, the lever being in neutral position when it is in the cross slot of this plate, and in this position being substantially axially centered in the opening in the housing above the universal bearing.

In order to lock the lever 2 in neutral position, that is, in the position with respect to the H-plate and the opening in the housing above the universal bearing hereinabove referred to, a slidable sleeve 20 is mounted upon the lever 2, this sleeve at its lower end being provided with an enlargement 22 adapted to fit within a cylindrical opening 24 in the housing 8, and when in this opening to hold the lever 2 in its neutral position. The sleeve 20 is preferably normally maintained out of engagement with the housing 8 and out of its position in the opening 24 by means of a spring 26 which bears at one end against a shoulder 28 on the lever 2 and at its other end against a shoulder 30 within the sleeve 20. The spring 26 normally holds the sleeve 20 against a removable collar 32 held upon the lever 2 by a set screw 34, this collar being adapted to be received in a socket 36 in the upper end of the sleeve 20. The sleeve 20 is preferably rotatable as well as slidable on the lever 2.

To secure the sleeve 20 in its position in the opening 24 in which it holds the lever 2 in neutral position, means are preferably provided for locking the sleeve 20 to the housing 8. The illustrated means comprise a bolt 38 slidable in a transverse socket 40 in an enlargement of the housing 8 at one side of the opening 24, the bolt 38 being preferably normally impelled toward the sleeve 20 by a spring 42 in a socket 44 in said bolt, this spring bearing at one end against the bottom of the socket in the bolt, and at its other end against the end of the socket 40 in the housing 8. This bottom of the socket in the housing 8 may be integral with the housing, as shown in Fig. 2, in which case an opening 46 is provided in the housing 8 directly opposite the open end of the socket 40 and on the side of the lever 2 remote from the socket 40, in order to permit the insertion of the bolt 38 and its spring 42 into the socket 40 before the lever is assembled in its bearing 6. In the construction shown in Figs. 1 and 3, the bottom of the socket 40 is formed by a sheet metal cap 48 inserted in the housing after the bolt 38 and its spring 42 have been assembled in the housing through the opening into which said cap 48 fits. The first described construction may be used where it is desired particularly to conceal the position of the locking bolt in the housing 8.

The sleeve 20 is provided with a peripheral groove 50 into which the end of the bolt 38 is shaped to enter to lock the sleeve in the housing 8. It will be noted that the end of the bolt 38 has an inclined upper face 52, a flat or horizontal lower face 54, and between these two faces a rounded nose 56, the rounded end of which extends somewhat about the lower edge of the end of the bolt, and that it also has a flat or horizontal upper face 58. It will further be noted that the groove in the sleeve 20 is provided with a flat lower wall 60 adapted to engage the flat underside 54 of the bolt 38 and that it is also provided with a beveled lower edge 62.

In order to effect the locking and unlocking movements of the bolt 38, lock mechanism of the barrel type is preferably provided, the illustrated locking mechanism being arranged in a cylindrical opening 64 in the housing 8 lying transverse to the socket 40 in which the bolt 38 slides. The rotatable barrel 66 of the lock is carried in a stationary part 68 confined in an enlarged part 70 of the cylindrical lock chamber, a part of the confining means being shown as a set screw 72 having its head within the housing 8. At its inner end, the lock barrel is provided with a segmental projection 74 which is slightly more than semi-circular in form, as shown in Fig. 9, this projection on the barrel 66 being received in a vertical slot 76 in the bolt 38. It will be noted from an inspection of Figs. 8 to 11 that the diameter of the segmental projection 74 is substantially equal to the width of the slot 76, and therefore when the barrel is turned to bring the greatest dimension or diameter of the projection 74 into horizontal position, the bolt 38 is locked against movement in either direction. When the barrel is turned to bring this diameter in vertical position as shown in Fig. 10, the bolt has a limited free movement backward against its spring until it strikes the flat face of the segment. In this position the bolt is not entirely withdrawn from the path of the sleeve 20 but its rounded end projects into the path of the inclined or beveled edge 62 of the lower side of the groove 50 in said sleeve.

From the foregoing description, the operation of the locking mechanism will be apparent. There are two positions of the lock in which the key can be withdrawn, that shown in Fig. 9 in which the slide 20 is positively locked in the position to hold the gear-shift lever from gear-shifting movement, and that shown in Fig. 10 in which the locking bolt 38 is held with its forward end slightly projected into the path of the sleeve 20 but free to be moved out of said path against the tension of the spring 42 when the sleeve is moved in either direction. In other words, when the sleeve is moved downward on the lever 2, its rounded under edge 78 engages the inclined face 52 on the locking bolt 38 and pushes the bolt back against the spring 42 until the bolt is again free to move forward to the limit of its movement in Fig. 10, in which position its rounded end 56 projects over the beveled edge 62. In this position the resistance of the bolt to the tendency of the sleeve 20 to move upward is sufficient to retain the sleeve in this position against the action of the spring 26. The sleeve can, however, be lifted out of this position by slight additional upward pressure.

When it is desired to lock the sleeve positively in the opening 24 in the housing 8 the key is inserted in the lock in the position shown in Fig. 10 either before or after the sleeve has been sprung past the end of the bolt 38, and the lock is then turned into the position shown in Fig. 9, thereby moving the bolt positively into the position shown in this figure and holding it positively in this position against movement in either direction. As pointed out, the key can now be withdrawn from the lock. When it is desired to unlock the sleeve, the key is inserted in the lock in the position shown in Fig. 9 and the lock is then turned into the position shown in Fig. 11, in which position the bolt is completely withdrawn from engagement with the sleeve 20, and the sleeve is free to move upward under the action of its spring 26. The key cannot be withdrawn from the lock, however, until it is again turned into the position shown in Fig. 10 in which the bolt is permitted to project slightly into the path of movement of the sleeve.

From the foregoing description it will be seen that before the lock can be moved into positive locking position, the key must be inserted in the lock, thus preventing locking of the gear-shift lever against movement when the key has been lost.

What I claim as new is:

1. In a transmission lock, the combination with the gear shifting lever, its universal bearing and a housing for said bearing extending above said bearing and having an opening in which said lever swings, of a sleeve slidable on said lever into and out of position in said opening and fitting said opening to hold said lever in neutral position, a socket extending laterally into said housing from said opening, a locking bolt and a spring for moving it arranged in said socket, a recess in said sleeve adapted to receive said bolt, and a hole in said housing on the side of said lever remote from said socket through which said bolt and spring may be inserted into said socket before said lever is assembled in its bearing.

2. In a transmission lock the combination with a gear shifting lever, its universal bearing and the housing for said bearing, of a sleeve slidable on said lever into and out of an engagement with said housing in which it holds said lever in neutral position, a locking bolt in said casing normally spring-pressed toward locking position, and key controlled bolt operating means having two positions in which the key can be withdrawn, in one of which said bolt is maintained in position to spring into a yielding retaining engagement with said sleeve as said sleeve is brought into engagement with said housing, and in the other of which said means positively holds said bolt in locking engagement with said sleeve.

3. In a transmission lock, the combination with the gear shifting lever, its universal bearing and a housing for said bearing having an integral extension above said bearing provided with an opening in which said lever swings, of a sleeve rotatable and slidable on said lever and shaped to fit within said opening to hold said lever in neutral position, a locking bolt concealed within said housing and spring pressed toward said sleeve, a peripheral groove in said sleeve adapted to be engaged by said bolt to lock said sleeve in position within said opening, and key-controlled means for partially withdrawing said bolt from said groove constructed to permit the complete withdrawal of said bolt, said bolt and said sleeve being provided with cooperating faces adapted to effect such withdrawal upon either a forced upward or a forced downward movement of said sleeve.

Signed at Detroit, Mich., this 15th day of July, 1921.

RUSSELL HUFF.

Witnesses:
 WM. E. SHOEMAKER,
 ALFRED H. KNIGHT.